(12) United States Patent
Wang et al.

(10) Patent No.: US 9,525,174 B2
(45) Date of Patent: *Dec. 20, 2016

(54) LITHIUM ION BATTERY

(71) Applicants: Tsinghua University, Beijing (CN); HON HAI PRECISION INDUSTRY CO., LTD., New Taipei (TW)

(72) Inventors: Li Wang, Beijing (CN); Xiang-Ming He, Beijing (CN); Jian-Jun Li, Beijing (CN); Jian Gao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 148 days.

This patent is subject to a terminal disclaimer.

(21) Appl. No.: 13/870,983

(22) Filed: Apr. 26, 2013

(65) Prior Publication Data
US 2014/0186717 A1 Jul. 3, 2014

(30) Foreign Application Priority Data

Dec. 27, 2012 (CN) .......................... 2012 1 0577625

(51) Int. Cl.
*H01M 4/60* (2006.01)
*H01M 4/587* (2010.01)
(Continued)

(52) U.S. Cl.
CPC ......... *H01M 4/608* (2013.01); *H01M 10/0525* (2013.01); *H01M 10/0565* (2013.01);
(Continued)

(58) Field of Classification Search
USPC ................................................ 429/303, 213
See application file for complete search history.

(56) References Cited

U.S. PATENT DOCUMENTS 6,001,509 A * 12/1999 Kim et al. ..................... 429/309
6,423,453 B1 * 7/2002 Noda ..................... H01M 4/525
429/231.95

(Continued)

FOREIGN PATENT DOCUMENTS

CN 1610177 4/2005
TW 201213366 4/2012

OTHER PUBLICATIONS

Fanous et al, Structure-Related Electrochemistry of Sulfur-Poly(acrylonitrile) Composite Cathode Materials for Rechargeable Lithium Batteries, Oct. 20, 2011, Chemistry of Materials, vol. 23, pp. 5024-5028.*

(Continued)

*Primary Examiner* — Ula C Ruddock
*Assistant Examiner* — Osei Amponsah
(74) *Attorney, Agent, or Firm* — Zhigang Ma (57) ABSTRACT

A lithium ion battery includes a cathode, an anode, and an electrolyte sandwiched between the cathode and the anode. The cathode includes a cathode active material. The anode is spaced from the cathode. The cathode active material includes a sulfur grafted poly(pyridinopyridine). The sulfur grafted poly(pyridinopyridine) includes a poly(pyridinopyridine) matrix and sulfur dispersed in the poly(pyridinopyridine) matrix. The sulfur includes a number of polysulfur groups or a number of elemental sulfur particles dispersed in the poly(pyridinopyridine) matrix. The electrolyte is a gel electrolyte.

2 Claims, 3 Drawing Sheets

(51) Int. Cl.
  *H01M 4/38*   (2006.01)
  *H01M 10/0525*  (2010.01)
  *H01M 10/0565*  (2010.01)

(52) U.S. Cl.
  CPC ............ *H01M 4/382* (2013.01); *H01M 4/587* (2013.01); *Y02E 60/122* (2013.01)

(56) References Cited

U.S. PATENT DOCUMENTS

| | | | |
|---|---|---|---|
| 8,922,171 B2* | 12/2014 | Shimizu et al. | 320/137 |
| 2002/0028389 A1* | 3/2002 | Sonoda et al. | 429/324 |
| 2002/0055039 A1* | 5/2002 | Seung | C07C 323/20 429/213 |
| 2004/0029011 A1* | 2/2004 | Ravet | H01M 4/36 429/231.95 |
| 2005/0053840 A1 | 3/2005 | Jo et al. | |
| 2006/0057464 A1* | 3/2006 | Kim | B01D 67/0011 429/306 |
| 2012/0059128 A1 | 3/2012 | He et al. | |

OTHER PUBLICATIONS

Xian guo Yu etal., "Characterization and electrochemical performance of conductive sulfur-containing polymer as cathode material for rechargeable lithium batteries", The Chinese Jeurnal of Nonferrous Metals, vol. 14, pp. 355-360, Oct. 2004.

* cited by examiner

LITHIUM ION BATTERY

CROSS-REFERENCE TO RELATED APPLICATION

This application claims all benefits accruing under 35 U.S.C. §119 from China Patent Application No. 201210577625.5, filed on Dec. 27, 2012, in the China Intellectual Property Office, the contents of which are hereby incorporated by reference.

BACKGROUND

1. Technical Field

The present disclosure relates to sulfur composite lithium ion batteries.

2. Description of Related Art

Sulfur has great potential for high-performance lithium ion batteries due to their large specific capacity, abundant resources and low cost.

Elemental sulfur particles dispersed in a conductive agent are used as a cathode active material of the lithium ion battery. The elemental sulfur particle has a large diameter of micrometer-scale. The external surface of the elemental sulfur particle firstly reacts with an electrolyte of the lithium ion battery during a discharge process of the lithium ion battery. The sulfur would be reduced to form $Li_2S$ and $Li_2S_2$ having a poor conductivity. The $Li_2S$ and $Li_2S_2$ would gradually cover the surface of the elemental sulfur particle in a form of solid state film. The internal sulfur cannot react with the electrolyte due to an obstruction of the $Li_2S$ and $Li_2S_2$. Thus, an active area of the elemental sulfur particle is decreased.

A liquid electrolyte capable of dissolving the $Li_2S$ and $Li_2S_2$ is adopted to promote the reaction between the electrolyte and the elemental sulfur particles. However, an intermediate product capable of dissolving in the electrolyte can be formed during the reaction. The intermediate product is polysulfide. Thus, an irreversible loss of sulfur is induced, thereby decreasing a capacity of the lithium ion battery.

What is needed, therefore, is to provide a sulfur composite lithium ion battery having a large utilization of the sulfur.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
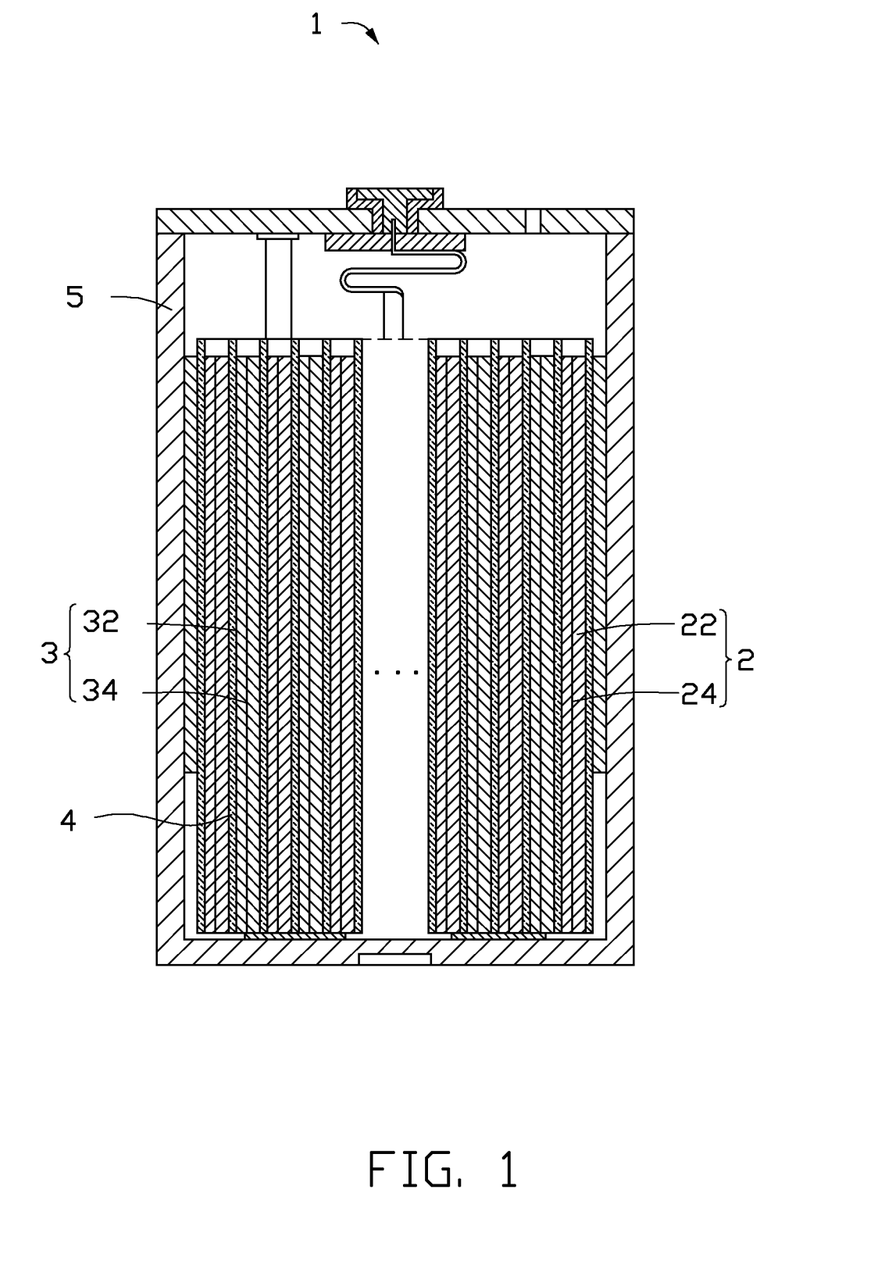
FIG. 1 shows a schematic view of one embodiment of a lithium ion battery.

Referring to FIG. 1, a lithium ion battery 1 includes a cathode 2, an anode 3, and an electrolyte 4. The cathode 2 and the anode 3 are spaced from each other. The electrolyte 4 is sandwiched between the cathode 2 and the anode 3.

The cathode 2 includes a cathode current collector 22 and a cathode material layer 24. The cathode current collector 22 is used to support the cathode material layer 24 and conduct current. A shape of the cathode current collector 22 can be sheet shape or network shape. A material of the cathode current collector 22 can be aluminum, titanium, or stainless steel. The cathode material layer 24 is disposed on at least one surface of the cathode current collector 22. The cathode material layer 24 includes a cathode active material. Furthermore, the cathode material layer 24 can include a conductive agent and an adhesive agent. The conductive agent, the adhesive agent, and the cathode active material can be uniformly mixed together.

The anode 3 includes an anode current collector 32 and an anode material layer 34. The anode current collector 32 is used to support the anode material layer 34 and conduct current. A shape of the anode current collector 32 can be sheet shape or network shape. A material of the anode current collector 32 can be copper, nickel, or stainless steel. The anode material layer 34 is disposed on at least one surface of the anode current collector 32. The anode material layer 34 includes an anode active material. Furthermore, the anode material layer 34 can include a conductive agent and an adhesive agent. The conductive agent, the adhesive agent, and the anode active material can be uniformly mixed together.

The cathode material layer 24 and the anode material layer 34 are opposite to each other and in contact with the electrolyte 4. The electrolyte 4 can be a gel electrolyte film. In one embodiment, the cathode 2, the gel electrolyte film, and the anode 3 are laminated with each other. The gel electrolyte film is sandwiched between the cathode 2 and the anode 3. The gel electrolyte film can conduct ions and cannot conduct electrons. Thus, the cathode 2 and the anode 3 can be separated from each other by the gel electrolyte film.

The conductive agent of the cathode material layer 24 can be the same as the conductive agent of the anode material layer 34. The adhesive agent of the cathode material layer 24 can be the same as the adhesive agent of the anode material layer 34. A material of the conductive agent can be carbon material, such as carbon black, conductive polymer, acetylene black, carbon fiber, carbon nanotubes, or graphite. A material of the adhesive agent can be polyvinylidene fluoride (PVDF), polytetrafluoroethylene (PTFE), fluororubber, ethylene propylene diene monomer (EPDM), or styrene-butadiene rubber.

In addition, the materials of the cathode current collector 22, the anode current collector 32, the conductive agent, and the adhesive agent are not limited and can be selected from current material used in the lithium ion battery.

Furthermore, the lithium ion battery 1 can include an external shell 5. The cathode 2, the anode 3 and the electrolyte 4 can be encapsulated in the external shell 5.

The cathode active material includes SPPY. The SPPY includes a poly(pyridinopyridine) (PPY) matrix and sulfur dispersed in the PPY matrix. A mass percentage of the sulfur in the SPPY is equal to or smaller than 41%. In one embodiment, the mass percentage of the sulfur in the SPPY is in a range from about 35% to about 41%. The sulfur can exist as a plurality of dispersed "poly-sulfur groups" or a plurality of dispersed elemental sulfur particles. Each of the "poly-sulfur groups" or each of the elemental sulfurs is in contact with the PPY matrix.

A material of the PPY matrix includes a chemical group of formula (1):

(1)

wherein n is an integer larger than 1.

The PPY matrix is formed from a cyclizing reaction of polyacrylonitrile (PAN).

In one embodiment, the sulfur exists as poly-sulfur group consisting of one or more sulfur elements, which can be represented by a formula of $S_{x1}$, wherein x1 is an integer between 1 and 8. The $S_{x1}$ is an atomic cluster with electrons. The poly-sulfur groups dispersed in the PPY matrix can be combined with the PPY matrix as a dopant. That is to say, the poly-sulfur groups are combined with the PPY matrix with a covalent bond. In one embodiment, $2 \leq x1 \leq 8$ (e.g., x=4). If the "poly-sulfur group" includes more than one sulfur element, the sulfur elements can be connected to each other as a chain. For example, if x=4, a formula of the "poly-sulfur group" is —S—S—S—S—, and if x=8, a formula of the "poly-sulfur group" is —S—S—S—S—S—S—S—S—, wherein "—" represents a covalent bond.

In one embodiment, the $S_{x1}$ is doped in the chemical group of formula (1) and covalent bonded with a carbon element thereof. For example, the SPPY can include a chemical group of formula (2):

(2)

The molecular weight of the SPPY can be equal to or larger than 188.

The $S_{x1}$ can also be covalently bonded with other functional groups at the other side of the sulfur chain. For example, the SPPY can include a chemical group of formula (3):

(3)

wherein R represents a functional group.

In the chemical group of formula (3), R is not limited and can be selected as needed, such as carboxyl groups, hydroxyl groups, and aromatic groups.

In another embodiment, R can also be the chemical groups of formula (1) or formula (2). For example, the SPPY can include a chemical group of formula (4):

(4)

wherein n1 and n2 are both integers larger than 1, and n1 and n2 can be the same or different.

The chemical group of formula (4) is formed by two chemical groups of formula (1) connected by the $S_{x1}$. Further, in the chemical group of formula (4), the two connected pyridinopyridine groups belong to different chemical groups of formula (1).

In another embodiment, the two connected pyridinopyridine groups can also belong to the same chemical group of formula (1). The two connected pyridinopyridine groups can be adjacent to each other or spaced by other pyridinopyridine groups.

For example, the SPPY can include a chemical group of formula (5) having two adjacent pyridinopyridine groups connected by $S_{x1}$:

(5)

When the two pyridinopyridine groups connected by $S_{x1}$ are spaced, the SPPY can include a chemical group of formula (6):

(6)

Wherein $S_y$ is also a "poly-sulfur group" including a sulfur chain, m and y are both an integer larger than 0. In one embodiment, $m \leq y \leq 6$.

In another embodiment, the sulfur in the PPY matrix is elemental sulfur particles. The elemental sulfur particles are uniformly dispersed in the PPY matrix. One elemental sulfur particle can be one sulfur molecule (e.g., a $S_8$ ring) or one sulfur atom cluster consisting of a plurality of sulfur atoms. For example, the sulfur atom cluster can be $S_{x2}$, wherein x2 is an integer between 1 and 7. As a large amount of the elemental sulfur particles are uniformly dispersed in the PPY matrix, and each elemental sulfur particle can be a sulfur molecule or sulfur atom cluster, the sulfur can be seen as monodispersed in the PPY matrix.

The SPPY can include both the poly-sulfur group and the elemental sulfur.

In the above formulas (1) to (6), the larger the value of n, n1, and n2, the more the pyridinopyridine groups are in the PPY matrix, the longer the chain of the pyridinopyridine groups, and the better the conductivity of the SPPY.

One embodiment of a method for making the SPPY includes steps of:

S1, mixing an elemental sulfur with a PAN to form a mixture;

S2, heating the mixture in vacuum or a protective gas at a temperature of about 250° C. to about 500° C., to form a sulfur containing composite; and S3, reacting the sulfur containing composite with a reducing agent for elemental sulfur in a liquid phase medium to remove part of the sulfur from the sulfur containing composite.

In the step S1, the elemental sulfur and the PAN can both have a shape of powder or particles. The powder or particles of the elemental sulfur and the PAN can be uniformly mixed by mechanically stirring at solid state. The molecular weight of the PAN is not limited, and can be in a range from 1000 to 100000. The amounts of the elemental sulfur and the PAN are not limited. In one embodiment, a mass ratio of the elemental sulfur to the PAN can be in a range from about 1:2 to about 10:1.

In the step S2, the solid elemental sulfur is heated to the gas state and uniformly dispersed on the surface of the PAN. At the same time, the PAN has a pyrolysis and a cyclizing process during the heating to form the PPY matrix. The sulfur in relatively small size is the poly-sulfur groups covalently bonded with the PPY matrix. The other part of the sulfur is elemental sulfur particles uniformly distributed in and composited with the PPY matrix. The elemental sulfur particles have relatively large size and weight (e.g., larger than a molecular weight of $S_8$). The elemental sulfur particles are combined with the PPY matrix by a weak intermolecular force, such as van der Waals attractive force between the elemental sulfur particles and the PPY matrix.

The protective gas can be an inert gas or a nitrogen gas.

Further, the step S2 can be processed in a sealed container filled with the protective gas. In the sealed container, the elemental sulfur will not leak out during the heating. Furthermore, due to the gasification of the elemental sulfur, the gas pressure in the sealed container can be larger than 1 atmospheric pressure. Therefore, the sealed container can promote a uniform dispersion of sulfur in the product. In one embodiment, the heating temperature is about 320° C. to about 400° C. At the temperature of about 320° C. to about 400° C., the PAN can be fully cyclized to form a plurality of pyridinopyridine groups joined together, such that the n of formula (1) can be equal to or larger than 10. In one embodiment, the heating temperature is about 350° C. The heating time can be determined by the amount of the mixture, and can be in a range from about 1 hour to about 10 hours.

In one embodiment, the mixture is heated in a sealed autoclave at a temperature of 350° C. for about 2 hours, and the mass percentage of the sulfur in the product of step S2 is about 47%.

In the step S3, the reducing agent has a relatively strong reducibility and can have a reducing reaction with elemental sulfur, to reduce the elemental sulfur to a lower valence (e.g., −2) of sulfur. For example, the elemental sulfur can be reduced to form the hydrogen sulfide ($H_2S$) or soluble sulfide, such as sodium sulfide ($Na_2S$), potassium sulfide ($K_2S$), and lithium sulfide ($Li_2S$). The reducing agent can be potassium borohydride ($KBH_4$) or hydrazine ($N_2H_4$).

The liquid phase medium can dissolve the reducing agent. The liquid phase medium can be water or ethanol. The sulfur containing composite is in solid state in the liquid phase medium and does not dissolve therein. The sulfur containing composite does not have a chemical reaction with the liquid phase medium. Thus, a liquid-solid mixture of the reducing agent and the sulfur containing composite can be formed in the liquid phase medium.

In the sulfur containing composite, there may be two forms of the sulfur, one is the poly-sulfur groups covalently bonded with the PPY matrix, and the other is the elemental sulfur particles. The elemental sulfur particles in relatively large sizes can be removed from the sulfur containing composite by having the reducing reaction. The sulfur containing composite can thus be formed into SPPY having the poly-sulfur groups covalently bonded with the PPY matrix.

Figure 2:
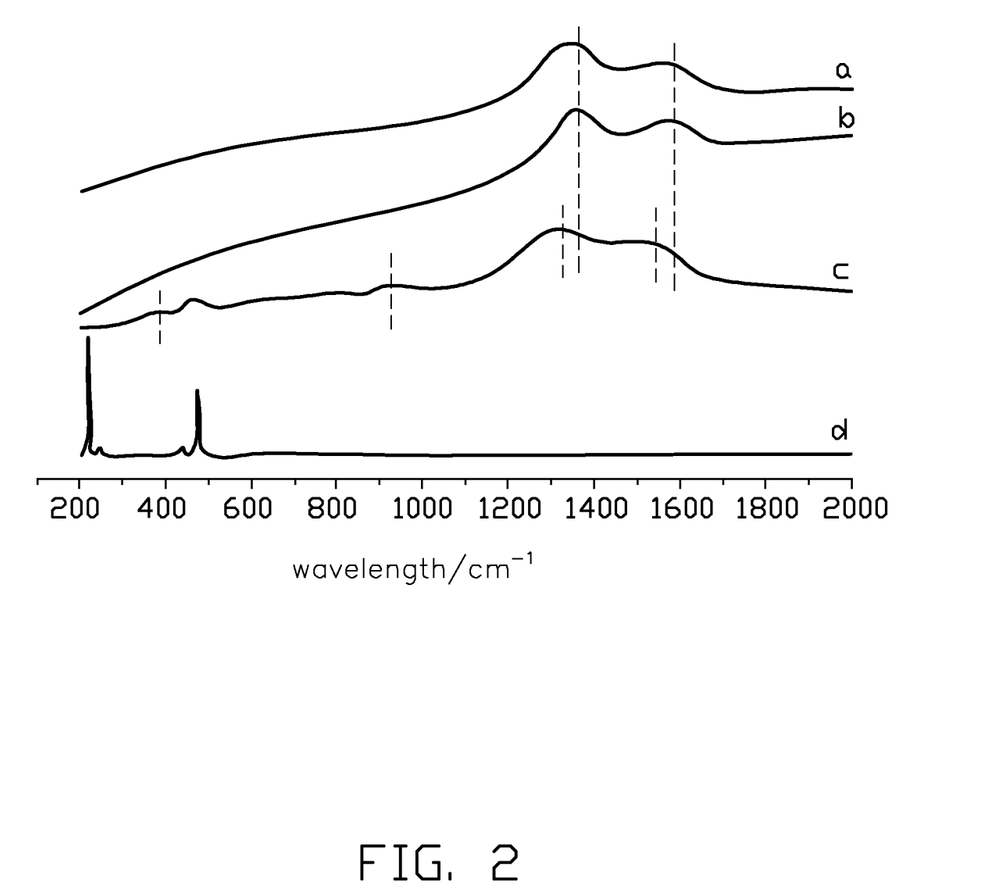
FIG. 2 shows a Raman spectra of (a) pyrolytic polyacrylonitrile (PAN) in argon atmosphere, (b) pyrolytic PAN in air, (c) sulfur grafted poly (pyridinopyridine) (SPPY), and (d) elemental sulfur.

Referring to FIG. 2, the SPPY is compared with the elemental sulfur and the pyrolytic pure PAN in the Raman spectra. In FIG. 2, the curve a is the Raman spectra of the pyrolytic pure PAN in an Ar gas, the curve b is the Raman spectra of the pyrolytic pure PAN in air, the curve c is the Raman spectra of the SPPY, and the curve d is the Raman spectra of the elemental sulfur. FIG. 2 shows that the curves a and b both have main bands at 1582 $cm^{-1}$ and 1375 $cm^{-1}$, which are often referred to as the G mode and D mode, respectively. However, these bands (387 $cm^{-1}$ and 928 $cm^{-1}$) in the curve c (i.e., for SPPY) shift to a lower wave number, which indicates that the sulfur and the PPY matrix are bonded by C—S covalent bonds.

In the step S3, the reducing agent and the sulfur containing composite are added into the liquid phase medium. The amount of the reducing agent can be excessive to completely remove the elemental sulfur particles. However, the poly-sulfur groups cannot be removed because of the covalent bond between the $S_{x1}$ and the PPY matrix. After the step S3, the mass percentage of the sulfur element in the SPPY is equal to or less than 41%.

By removing the elemental sulfur particles, a capacity retention of the lithium ion battery using the SPPY as the electrode active material can be improved. Therefore, the step S3 is not a purification step to remove the elemental sulfur particles. This is because the elemental sulfur particles itself has the capacity during the cycling of the lithium ion battery (i.e., the elemental sulfur itself is a cathode active material). In addition, even if a theoretical capacity of the electrode active material may decrease, the capacity retention of the lithium ion battery 1 can increase. A content of the sulfur in the SPPY can be kept in a suitable range after removing the elemental sulfur particles having large diameter. A diameter of the residual poly-sulfur groups is small. The residual poly-sulfur groups cannot be agglomerated together and can be in contact with the PPY matrix. The poly-sulfur groups having a small diameter can fully react with the gel electrolyte during the discharging process of the lithium ion battery, thereby increasing an active area of the cathode active material. Thus, after being repeatedly discharged for a plurality of times, the lithium ion battery 1 has a higher capacity than a lithium ion battery using the SPPY without removing the elemental sulfur particles having a large diameter.

The step S3 can include steps of:

S31, introducing the sulfur containing composite into a container having the liquid phase medium filled therein;

S32, uniformly dispersing the sulfur containing composite in the liquid phase medium through mechanical stirring or ultrasonic vibration;

S33, adding the reducing agent into the container while continuously mechanically stirring or ultrasonically vibrating the liquid phase medium, to dissolve the reducing agent in the liquid phase medium and react the reducing agent with the sulfur containing composite; and S34, separating the achieved SPPY from the liquid phase medium and purifying the achieved SPPY.

Further, in the step S33, the liquid phase medium can be heated to promote the chemical reaction between the reducing agent and the sulfur containing composite. The heating temperature in the step S33 can be in a range from about 90° C. to about 150° C.

In another embodiment, the step S3 can include steps of:

S31', introducing the sulfur containing composite with the reducing agent into a container having the liquid phase medium filled therein;

S32', mechanically stirring or ultrasonically vibrating the liquid phase medium to uniformly disperse the sulfur containing composite in the liquid phase medium while dissolving the reducing agent in the liquid phase medium and reacting the reducing agent with the sulfur containing composite; and S33', separating the achieved SPPY from the liquid phase medium and purifying the achieved SPPY.

Further, in the step S32', the liquid phase medium can be heated to promote the chemical reaction between the reducing agent and the sulfur containing composite. The heating temperature in the step S33 can be in a range from about 90° C. to about 150° C.

Further, after the step S3, the method can further include a step S4 of electrochemically reducing the "poly-sulfur groups" of $S_{x1}$ into elemental sulfur. The reducing voltage for the electrochemically reducing "poly-sulfur group" of $S_{x1}$ can be about 1.7 V to about 1.75 V (vs. Li$^+$/Li). In one embodiment, the final product can be arranged in an electrochemical reactor (e.g., in an electrochemical battery) as an anode electrode, and then the battery is discharged at a voltage of about 1.7 V to about 1.75 V (vs. Li$^+$/Li). In one embodiment, the counter electrode is lithium metal, the battery is discharged using a constant current density of about 20 mA/g until the battery reaches a discharge cut-off voltage of about 0V. The "poly-sulfur group" has one or more sulfur elements (smaller than 8), and the "poly-sulfur group" is joined to the carbon atoms of the PPY matrix by covalent bonds. Thus, due to the electrochemically reducing step, the covalent bonds are broken, and a plurality of elemental sulfur particles, each of which is one sulfur molecule (e.g., a $S_8$ ring) or a sulfur atom cluster having 1 to 7 sulfur atoms can be formed. The plurality of elemental sulfur particles are uniformly dispersed in the PPY matrix. However, the electrochemically reducing step of the step S4 is an irreversible reaction. The elemental sulfur particles cannot be joined to the carbon atoms of the PPY matrix again by covalent bonds through an electrochemically oxidizing step. The SPPY includes the elemental sulfur and PPY matrix after step S4. The elemental sulfur can be sulfur molecule or sulfur atom cluster. The elemental sulfur can be uniformly dispersed in the PPY, thereby improving an electrochemical stability.

In one embodiment, the elemental sulfur particles have a molecular sized diameter and uniformly dispersed in the PPY matrix after the step S4. The elemental sulfur particles are in contact with the PPY matrix. If the SPPY is used as the cathode active material of the lithium ion battery, the sulfur molecules and sulfur atom clusters in the elemental sulfur particle are exposed and in contact with the electrolyte. When discharging of the lithium ion battery, the sulfur molecules and the sulfur atom clusters in each of the elemental sulfur particle can fully react with the electrolyte. However, in current lithium ion battery using the elemental sulfur as the cathode active material, the sulfur molecules and the sulfur atom clusters in each of the elemental sulfur particle are agglomerated together. Thus, some sulfur molecules and sulfur atom clusters are located in the internal location of the elemental sulfur particle. The internal sulfur molecules and sulfur atom clusters cannot be in contact with the electrolyte. When discharging of the lithium ion battery, the external sulfur molecules and sulfur atom clusters in the elemental sulfur particle first react with the electrolyte to form $Li_2S$ and $Li_2S_2$, the $Li_2S$ and $Li_2S_2$ would gradually cover the internal sulfur molecules and sulfur atom clusters in a form of solid state film. Thus, a reaction between the electrolyte and the internal sulfur molecules and sulfur atom clusters would be obstructed.

The anode active material can be metal lithium, carbon material inserted by lithium, or lithium alloy. The carbon material inserted by lithium can be crystal carbon or amorphous carbon. The lithium alloy can be lithium aluminum alloy or lithium stannum alloy.

The gel electrolyte includes a polymer substrate, a metal lithium salt, and an organic solvent. The metal lithium salt can be dissolved in the organic solvent to form a solution. The polymer substrate can be wetted by the organic solvent with the metal lithium salt dissolved therein. The polymer substrate can have a porous network structure. A porosity of the polymer substrate can be in a range from about 40% to about 85%. In one embodiment, the porosity of the polymer substrate is in a range from about 60% to about 75%. A diameter of the pores in the polymer substrate can be in a range from about 0.5 microns to about 10 microns. In one embodiment, the diameter of the pores is in a range from about 1 micron to about 5 microns. The organic solvent is filled into the pores.

A material of the polymer substrate can be copolymer of vinylidene fluoride-hexafluoropropylene, Poly(acrylonitrile-methyl methacrylate), Poly(acrylonitrile-butyl acrylate), Poly(vinylidene fluoride-hexafluoropropylene)-Poly(methyl methacrylate), or poly(acrylonitrile-methoxy polyethylene glycol(350) monoacrylate-lithium acrylate. The metal lithium salt can be $LiClO_4$, $LiPF_6$, $LiBF_4$, $LiSO_3CF_3$, or $LiN(CF_3SO_2)_2$.

The organic solvent can be ethylene carbonate (EC), polycarbonate (PC), diethyl carbonate (DEC), dimethyl formamide (DMF), or tetraethylene glycol dimethyl ether (TEGDME).

A molar concentration of the solution formed by dissolving the metal lithium salt in the organic solvent can be in a range from about 0.5 mol/L to about 3 mol/L. A quantity of the solution can be determined to wet the polymer substrate or fill the pores of the polymer substrate.

Further, the gel electrolyte can comprise an inorganic filler uniformly dispersed in the polymer substrate. The inorganic filler can be uniformly dispersed in the polymer substrate. The inorganic filler can be $Al_2O_3$ nanoparticles or $SiO_2$ nanoparticles. A mass ratio of the inorganic filler to the polymer substrate can be in a range from about 1:1 to about 1:0.05. The inorganic filler can improve a mechanical property and an adhesive of the gel electrolyte. Thus, the gel electrolyte can be stably combined with the cathode and the anode. Interface stability between the gel electrolyte and the cathode, and the gel electrolyte and the anode can be increased.

A method for making the gel electrolyte includes the following steps:

M1, fabricating the polymer using an emulsion polymerization method;

M2, dissolving the polymer in a solvent to form a polymer solution;

M3, coating the polymer solution on a glass plate to form a polymer film, and standing the polymer film for a determined period;

M4, disposing the polymer film on the glass plate in a deionized water by inverting, thereby forming a plurality of pores in the polymer film;

M5, drying and stripping the polymer film having a plurality of pores, thereby forming the porous polymer substrate;

M6, immersing the porous polymer substrate in the organic solvent with the metal lithium salt dissolved therein, wherein the organic solvent with the metal lithium salt dissolved therein fully fills in the pores;

M7, removing the polymer substrate from the organic solvent, and removing the spare organic solvent on the surface of the polymer substrate, thereby forming the gel electrolyte film.

Further, the inorganic filler can be uniformly dispersed in the solvent in the step M2.

Thus, the gel electrolyte is a porous polymer network system swelled by the solvent. The gel electrolyte is a semi-solid. A free liquid in the polymer substrate is little, and thus a small amount of intermediate product (polysulfide) generated by the electrochemical reaction can be dissolved in the gel electrolyte. Thus, a loss of the sulfur is decreased during the electrochemical reaction.

EXAMPLE 1

1.6 g of elemental sulfur powders is uniformly mixed with 1 g of PAN powders to form a mixture. The mixture is put into a sealed autoclave filled with the nitrogen gas and heated at a temperature of about 350° C. for about 2 hours. After that, the heating is stopped and the autoclave is cooled down to room temperature. The sulfur containing composite is achieved and then dispersed in 100 ml of water through an ultrasonic vibration. Then 0.7 g $KBH_4$ is dissolved into the water accompanying with a stirring of the water for about 2 hours. The $KBH_4$ is reacted with the sulfur containing composite in the water, and then the solid product SPPY is filtered out from the water, washed twice, and dried at about 60° C. A lithium ion battery is assembled using the SPPY as the cathode active material. The conducting agent is acetylene black. The binder is PVDF. The anode is metal lithium. The gel electrolyte includes copolymer of vinylidene fluoride-hexafluoropropylene, and 1 mol/L $LiPF_6$/EC+DEC (1:1, v:v).

The lithium ion battery is cycled using a constant current in a galvanostatic charge/discharge measurement. As shown in table 1, all the coulombic efficiencies per cycle for 100 cycles are above 99%. The test result is shown in Table 1.

EXAMPLE 2

The SPPY is prepared by using the same method as in Example 1. The lithium ion battery is assembled and cycled under the same conditions as in Example 1 except that the gel electrolyte includes poly(acrylonitrile-methyl methacrylate), and 1 mol/L $LiPF_6$/EC+DEC (1:1, v:v). The test result is shown in Table 1.

EXAMPLE 3

The SPPY is prepared by using the same method as in Example 1. The lithium ion battery is assembled and cycled under the same conditions with Example 1 except that the gel electrolyte includes poly(acrylonitrile-methyl methacrylate), 1 mol/L $LiPF_6$/EC+DEC (1:1, v:v), and $SiO_2$ nanoparticles. A mass ratio of the poly(acrylonitrile-methyl methacrylate) to the $SiO_2$ nanoparticles is 85:15. The test result is shown in Table 1.

EXAMPLE 4

1.6 g of elemental sulfur powders is uniformly mixed with 1 g of PAN powders to form a mixture. The mixture is put into a sealed autoclave filled with the nitrogen gas and heated at a temperature of about 350° C. for about 2 hours. After that, the heating is stopped and the autoclave is cooled down to room temperature. The sulfur containing composite is achieved and then dispersed in 100 ml of water through an ultrasonic vibration. Then 25 ml of $N_2H_4$ having a molar concentration of 0.5 mol/L is added into the water accompanying with a stirring of the water for about 2 hours. The $N_2H_4$ is reacted with the sulfur containing composite in the water, and then the solid product SPPY is filtered out from the water, washed twice, and dried at about 60° C. The lithium ion battery is assembled and cycled under the same conditions as Example 1. The test result is shown in Table 1.

COMPARATIVE EXAMPLE 1

Figure 3:
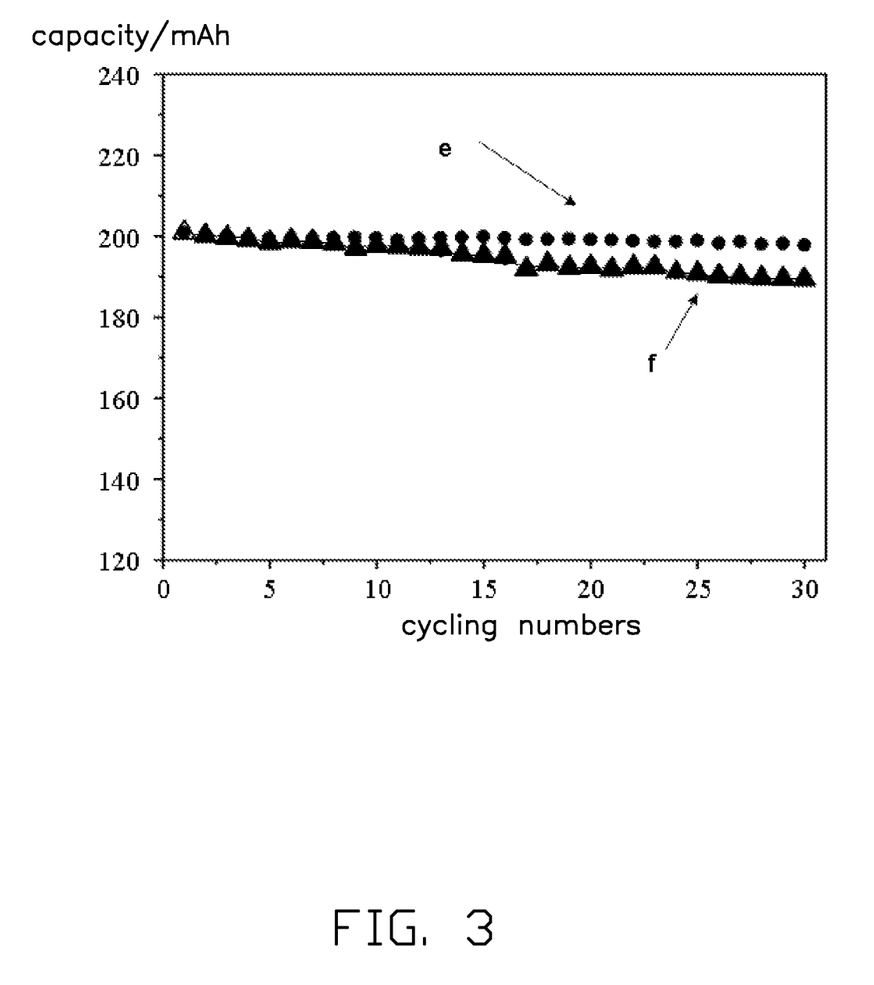
FIG. 3 shows discharge cycling curves of the lithium ion battery of the FIG. 1 and a lithium ion battery of a comparative example.

The SPPY is prepared by using the same method as in Example 1. The lithium ion battery is assembled and cycled under the same conditions as Example 1 except that the electrolyte is 1 mol/L $LiPF_{6/EC+DEC}$ (1:1,v:v). Referring to FIG. 3, the curve e shows the discharging cycling curve of the lithium ion battery of the example 1, and the curve f shows the discharging cycling curve of the lithium ion battery of the comparative example 1. The test result is shown in Table 1.

COMPARATIVE EXAMPLE 2

The sulfur containing composite is prepared by using the same method as in Example 1. The lithium ion battery is assembled and cycled under the same conditions as Example 1 except that the sulfur containing composite is directly used as the cathode active material. The test result is shown in Table 1.

TABLE 1

| | Mass percentage of the sulfur in the cathode active material | Capacity retention after 30 cycles | Capacity retention after 50 cycles | Capacity retention after 100 cycles |
| --- | --- | --- | --- | --- |
| Example 1 | 41% | 99% | 98.5% | 97.0% |
| Example 2 | 41% | 99.1% | 98.8% | 97.4% |
| Example 3 | 41% | 99.3% | 98.9% | 97.3% |
| Example 4 | 41% | 98.9% | 98.2% | 97.6% |
| Comparative Example 1 | 41% | 94.5% | 93.5% | 83.8% |
| Comparative Example 2 | 47% | 94.0% | 93.2% | 84.9% |

It is clearly found from Table 1 that the capacity retention of the lithium ion battery using gel electrolyte and the cathode active material of SPPY is higher than that of the lithium ion battery using electrolyte solution and the cathode active material of SPPY, and the lithium ion battery using electrolyte solution and the cathode active material of sulfur containing composite, because the sulfur of SPPY can fully reacted during discharging of the lithium ion battery. Furthermore, a small amount of the polysulfide can be dissolved in the gel electrolyte, a wastage of the sulfur is thus little.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium ion battery comprising:
    a cathode comprising a cathode active material;
    an anode spaced from the cathode; and
    an electrolyte located between the cathode and the anode;
    wherein the cathode active material is a sulfur grafted poly(pyridinopyridine) consisting of a poly(pyridinopyridine) matrix and a plurality of sulfur molecules dispersed in the poly(pyridinopyridine) matrix, and a mass percentage of the plurality of sulfur molecules in the poly(pyridinopyridine) matrix is equal to or smaller than 41%; the electrolyte is a gel electrolyte consisting of a polymer substrate defining a plurality of pores, an organic solvent, a metal lithium salt dissolved in the organic solvent, and an inorganic filler dispersed in the polymer substrate, and the organic solvent with the metal lithium salt dissolved therein fills the plurality of pores of the polymer substrate; and a material of the polymer substrate is copolymer of vinylidene fluoride-hexafluoropropylene, a material of the metal lithium salt is $LiPF_6$, the organic solvent is made of ethylene carbonate and diethyl carbonate with a same volume, and the inorganic filler consists of a plurality of $Al_2O_3$ nanoparticles.

2. The lithium ion battery of claim 1, wherein a molar concentration of the organic solvent with the metal lithium salt dissolved therein is in a range from about 0.5 mol/L to about 3 mol/L.

* * * * *